US005945940A

United States Patent [19]

Cuomo

[11] Patent Number: 5,945,940

[45] Date of Patent: Aug. 31, 1999

[54] COHERENT ULTRA-WIDEBAND PROCESSING OF SPARSE MULTI-SENSOR/ MULTI-SPECTRAL RADAR MEASUREMENTS

[75] Inventor: Kevin M. Cuomo, Westford, Mass.

[73] Assignee: Massachusetts Institute of Technology, Cambridge, Mass.

[21] Appl. No.: 09/041,831

[22] Filed: Mar. 12, 1998

[51] Int. Cl.[6] .......... G01S 13/89

[52] U.S. Cl. .......... 342/90; 342/195; 342/202

[58] Field of Search .......... 342/90, 21, 25, 342/192, 193, 194, 195, 196, 197, 179, 202

[56] References Cited

U.S. PATENT DOCUMENTS 5,191,343 3/1993 Danzer et al. .......... 342/21

5,381,151 1/1995 Boles et al. .......... 342/21

*Primary Examiner*—John B. Sotomayor

*Attorney, Agent, or Firm*—Fenwick & West LLP

[57] ABSTRACT

A radar system coherently combines signals from independent upper- and lower-sub-band radars, mutually coheres the sub-band radar signals, and performs model fitting and parameter estimation to obtain ultra-wideband data signatures from a target. Signal processing models are used to compensate for potential lack of mutual coherence between the various sub-bands. An ultra-wideband signal model is fitted to the sparse sub-band measurements to accurately characterize ultra-wideband target scattering and provide for meaningful interpolations or extrapolations outside of the measurement sub-bands.

14 Claims, 5 Drawing Sheets

COHERENT ULTRA-WIDEBAND PROCESSING OF SPARSE MULTI-SENSOR/ MULTI-SPECTRAL RADAR MEASUREMENTS

SUBJECT INVENTION

The present invention is a subject invention under contract/grant no. F19628-95-C-0002 with the United States Government, and as such the United States Government has rights therein.

FIELD OF THE INVENTION

The present invention relates generally to radar systems and methods, and specifically to application of coherent processing to ultra-wideband radar pulses to generate super-resolved radar images.

DESCRIPTION OF BACKGROUND ART

Research and development in the field of wideband radar systems has been undertaken for many years. The impetus for this development was rooted in the successful application of high power instrumentation radars for research in ballistic missile defense and satellite surveillance. Current wideband imaging radars provide considerable real-time discrimination and combat identification capability. Advanced signal processing methods have significantly improved the resolution of processed radar return signals, further improving the state-of-the-art in wideband radar technology.

The ability to identify targets and accurately estimate their size and shape is critical to many applications. In one exemplary application involving a potential ballistic missile defense scenario, defensive strategies rely on accurate target identification and size/shape estimation. The primary goal of a defensive radar system is to find the threat target and provide missile guidance to an interceptor so as to destroy the target with a high probability of success. This can be difficult when there are many objects in the radar's field of view, some purposefully designed to fool radar discrimination algorithms. Decoys, for example, may have radar-cross-section (RCS) levels similar to those of the warhead, making robust target selection based on RCS levels, alone, difficult. Narrowband radars usually lack sufficient range resolution to allow a direct measurement of the target's length, although they are generally useful for tracking and coarse motion estimation. Wideband radars permit a much larger suite of target discrimination algorithms to be employed. Real-time range-Doppler imaging and phase-derived range estimation, for example, are possible with today's wideband radar technology. These techniques permit isolation of individual scattering centers, e.g., nosecone and fin edges, into small range-resolution cells providing a means to measure the target's size and shape.

To achieve fine range resolution, field radars utilize coded waveforms with large time-bandwidth products. Wideband "chirp" waveforms are commonly used in practice due to their ease of generation and processing in the radar receiver. By mixing the radar return signals with a replica of the transmitted signal, a baseband signal is produced with frequency components that are proportional to the relative range between scattering centers on the target. The baseband signal is sampled and Fourier-transformed to provide a range-resolved profile of the target. This process is called pulse-compression. Properties of the compressed pulse, such as resolution and sidelobe levels, depend on the extent and shape of the window function applied to the baseband signal samples. The Fourier theory relations define resolution to be inversely proportional to the total signal length. This means that range resolution improves as radar bandwidth increases.

Many field radars operate on these basic wideband principles. The ALCOR C-band radar was developed in 1970 for the purpose of wideband discrimination research. ALCOR utilizes a wideband chirp waveform with a bandwidth of 512 MHz providing ALCOR with a range resolution capability of about 53 cm. Kwajalein's millimeter-wave radar (MMW) can operate at the Ka- and W-bands and is capable of a transmission bandwidth of 2000 MHz, providing an impressive 14 cm range resolution capability.

The United States also operates high-resolution wideband radars on transportable platforms. One example is COBRA JUDY, which uses S-band phased array and X-band dish antenna radars.

The field radars discussed above provide a high degree of range resolution. Because their intended applications are usually very demanding, however, it is often desirable to significantly improve their existing range resolution capabilities: Important target features are often exhibited over a much smaller than conventionally-processed range resolution cell. To improve a radar's range resolution, one can either increase the radar's bandwidth or process the received signals with super-resolution algorithms. Cost and design limitations are major practical drawbacks to increasing a radar's hardware bandwidth. The desire to obtain higher-resolution radar data without incurring tremendous costs motivated development of robust super-resolution algorithms that can be applied to a wide range of real-world data sets.

In 1990, the Lincoln Laboratory of the Massachusetts Institute of Technology developed a super-resolution algorithm to significantly improve the range resolution of processed radar return signals. The algorithm, which is referred to as bandwidth extrapolation (BWE), increases the effective bandwidth of a radar waveform by predicting the target's response at frequencies that lie outside of the measurement bands. In real-world radar applications, BWE typically improves the range resolution of compressed radar pulses by a factor of two or three. Bandwidth extrapolation often provides striking improvements in the quality of wideband radar images. See K. M. Cuomo, "A bandwidth extrapolation technique for improved range resolution of coherent radar data" Technical Report CJP-60 Rev.1, Lincoln Laboratory, MIT, 1992; S. L. Borison, S. B. Bowling and K. M. Cuomo, "Super-resolution methods for wideband radar" Lincoln Laboratory Journal, vol. 5, No. 3, pp 441–461, 1992; the contents of which are incorporated herein by reference.

Bandwidth extrapolation improves resolution, but the approach has some inherent limitations. The algorithm is based on signal processing models that characterize a complex target as a collection of point scatterers, each with its own frequency independent scattering amplitude. Such models are often sufficient for typical wideband signal processing where the waveforms have only a small fractional bandwidth compared to the center frequency. Over ultra-wide bandwidths, i.e. where the radar's bandwidth is comparable to it's center frequency, the scattering amplitude of the individual scattering centers can vary significantly with frequency. Spheres, edges, and surface joins are examples of realistic scattering centers that exhibit significant amplitude variations as a function of frequency.

Measuring or estimating a target's ultra-wideband radar signature is very useful from many radar discrimination and target identification viewpoints. Not only would extremely fine range resolution be obtained, but the amplitude variations of isolated scattering centers would help in typing the scattering center. Many canonical scattering centers are known to exhibit $f^{\alpha}$-type scattering behavior, e.g. the RCS of flat plates, singly curved surfaces (cone sections), and doubly curved surfaces (sphere) vary as $f^2$, $f^1$, and $f^0$, respectively. The RCS of a curved edge varies as $f^{-1}$, whereas, a cone vertex may be characterized with an $f^{-2}$ RCS frequency dependence. One of the goals of UWB processing is to detect these frequency dependent terms in the measured data and to exploit them for scattering type identification.

Fielding a true UWB radar can be very expensive. Accordingly, a need remains for a system and method providing the benefits of ultra-wideband radar without the cost, both monetary and in terms of required bandwidth, of a true ultra-wideband radar.

SUMMARY OF THE INVENTION

In accordance with the invention, conventional wideband radars (111, 112) are used to sample a target's response over a set of widely spaced sub-bands. In one aspect of the invention, S- and X-band radars are used together to collect coherent target measurements over two widely spaced sub-bands. The target's ultra-wideband radar signature is estimated by coherently processing these sub-bands together. Thus, considerable increases in processing bandwidth are achieved with corresponding improvements in range resolution and target characterization capability.

In another aspect of the invention, signal processing methods are used to compensate for potential lack of mutual coherence (120) between the various radar sub-bands.

In still another aspect of the invention, an appropriate ultra-wideband signal model is fitted (140) to the sparse sub-band measurements to accurately characterize ultra-wideband target scattering and provide for meaningful interpolations or extrapolations outside of the measurement sub-bands. In a specific related aspect, S-band and X-band radar signature data are interpolated to provide an estimate of C-band signature data.

In yet another aspect of the invention, more than two sub-bands are employed.

In still another aspect of the invention, signal processing is used for optimally estimating parameters for an ultra-wideband signal model.

In a further aspect of the invention, measured and estimated data are combined in a manner that preserves phase distribution across measured and estimated sub-bands. In a related aspect of the invention, coherent imaging algorithms are applied to resulting ultra-wideband radar pulses derived from measured and estimated data.

The features and advantages described in the specification are not all inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

DETAILED DESCRIPTION OF THE DRAWINGS

The figures depict a preferred embodiment of the present invention for purposes of illustration only. Those skilled in the art will readily recognize from the following discussion that alternative embodiments of the structures and methods illustrated herein may be employed without departing from the principles of the invention described herein.

Figure 1:
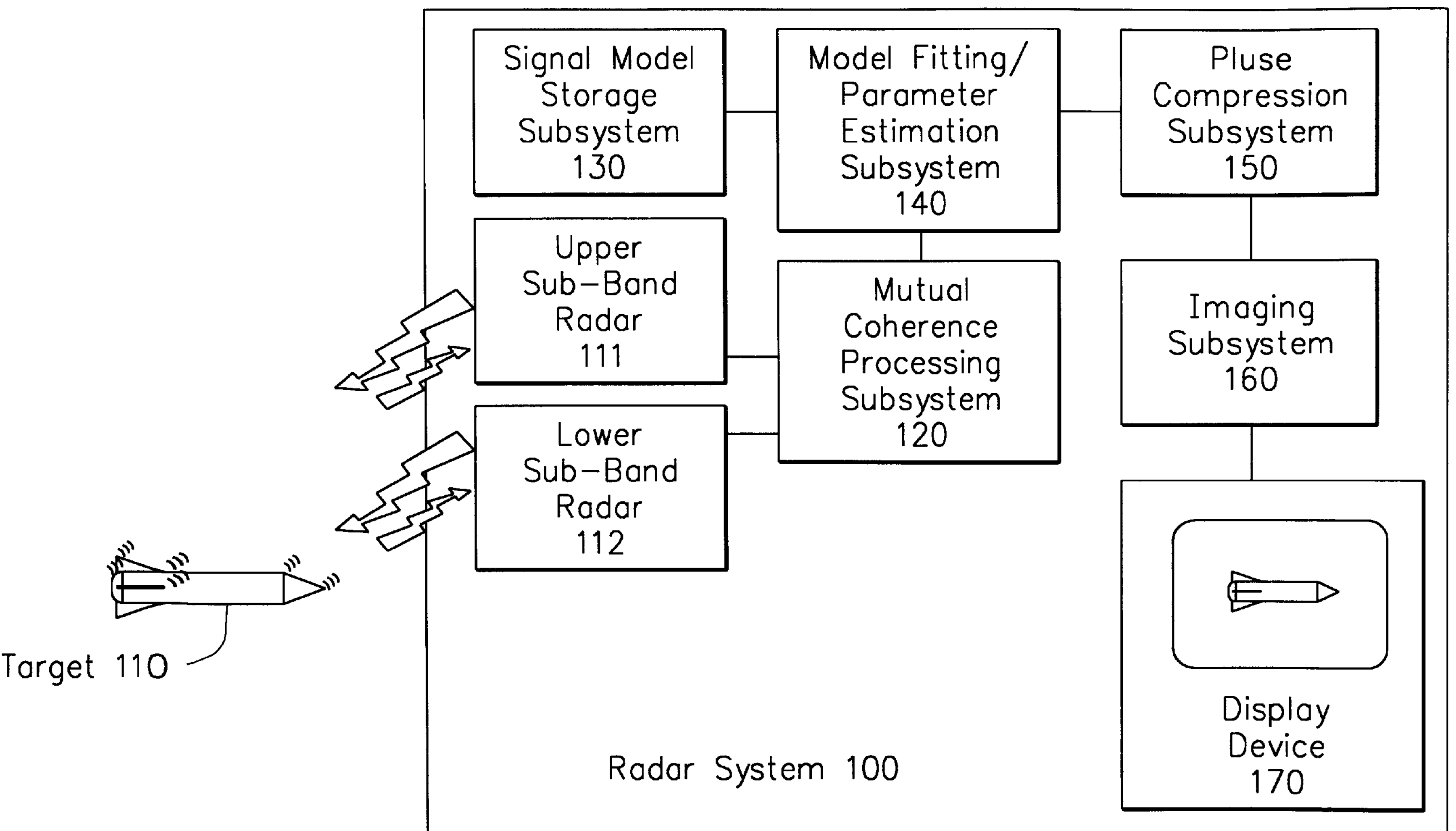
FIG. 1 is a block diagram of a radar system in accordance with the present invention.

Referring now to FIG. 1, there is illustrated a radar system 100 including UWB coherent processing in accordance with the present invention. The primary components of radar system 100 are upper sub-band radar 111, lower sub-band radar 112, mutual coherence processing subsystem 120, signal model storage subsystem 130, model fitting/parameter estimation subsystem 140, pulse compression subsystem 150, imaging system 160, and display device 170.

In a preferred embodiment, upper sub-band radar subsystem 111 is implemented using a conventional X-band radar, and lower sub-band radar subsystem 112 is implemented using a conventional S-band radar. A mutual coherence processing subsystem 120, described in greater detail below, is used to mutually cohere the radar sub-bands. A model fitting/parameter estimation subsystem 140, also described below, takes as input the mutually coherent sub-band signals and, based on a signal model stored in signal model storage system 130, provides estimated UWB data based on extrapolation and interpolation. The estimated UWB data are then applied to pulse compression subsystem 150, which conventionally processes such data to yield a super-resolved range profile of the target 110. Imaging subsystem 160 and display device 170 then conventionally process such profile into a usable output form, such as a display of the target 110 on a screen. In a preferred embodiment, signal model storage system 130, pulse compression subsystem 150, imaging subsystem 160 and display device 170 are all conventional components well known in the field of UWB radar signal processing. See K. R. Roth, M. E. Austin, D. J. Frediani, G. H. Knittel and A. V. Mrstik, "The Kiernan reentry measurements system on Kwajalein Atoll," Lincoln Laboratory Journal, vol. 2, No. 2, pp 247–276, 1989; G. W. Meurer, Jr., "The TRADEX Multi-target Tracker," Lincoln Laboratory Journal, vol. 5, No. 3, pp 317–349, 1992.

Ultra-wideband processing calls for a consistent set of spectral signals in each sub-band, i.e. the all-pole models for each sub-band must be consistent. This is not an issue in conventional multi-band radar systems specifically designed to be mutually coherent. Mutual coherence problems will most likely occur, however, when the sub-band measurements are collected by separate wideband radars operating independently, such as radars 111, 112. Thus, radar system 100, in order to enjoy the benefits of UWB, applies a signal processing approach that compensates for the potential lack of mutual coherence between any number of radar sub-bands. As a result, radar system 100 can be implemented using a wide range of conventional radar platforms that are already being used in the field.

Summarizing the operation of radar system 100, an estimate of ultra-wideband radar signature of target 110 is obtained by coherently combining sparse sub-band measurements. While FIG. 1 illustrates a system using UWB processing for only two sub-bands, it is straightforward to apply this processing to an arbitrary number of sub-bands.

Figure 2:
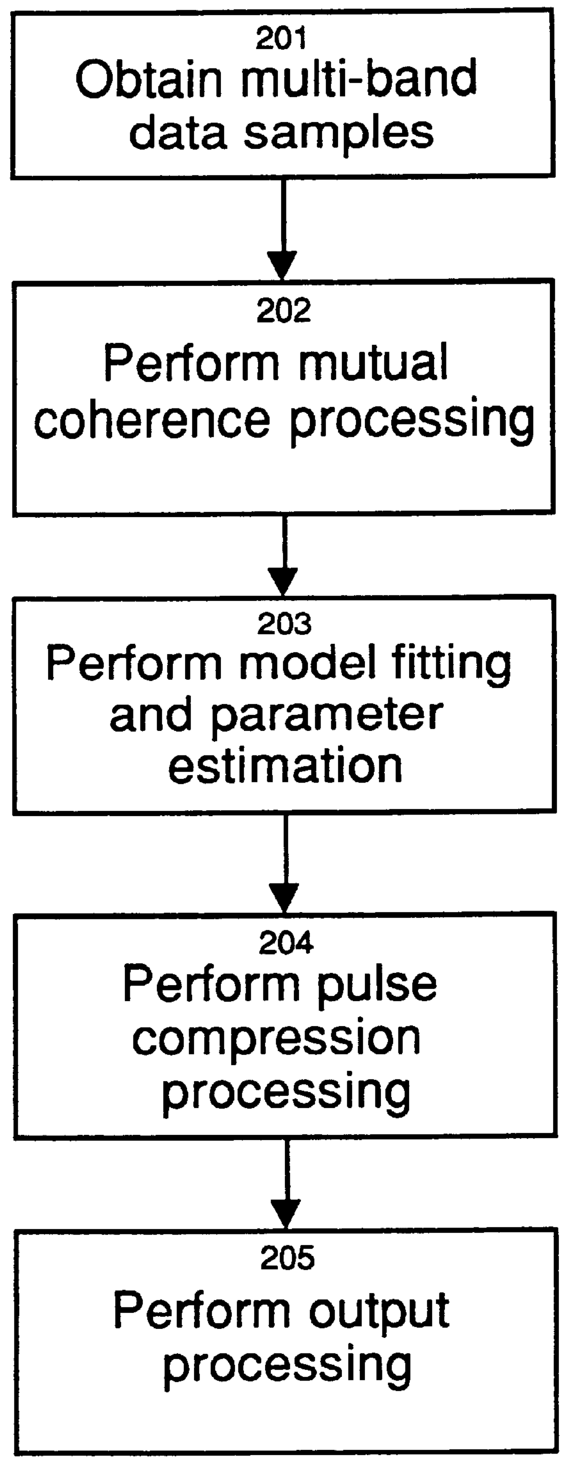
FIG. 2 is a flow diagram of overall signal processing in accordance with the present invention.

Referring now also to FIG. 2, processing in accordance with the present invention is shown. The principal stages of such processing are obtaining 201 multi-band data samples; performing 202 mutual coherence processing of the multi-band data samples; performing 203 optimal fitting of signal models and parameter estimation on the mutually cohered data using stored signal model information to permit interpolation and extrapolation outside of the measurement sub-bands; performing 204 conventional pulse compression processing on the enlarged band of spectral data to provide a super-resolved range profile of target 110; and performing 205 additional output processing as desired, such as visual display of target 110, automated detection/discrimination for countermeasure purposes, and the like.

Referring specifically now to mutual coherence processing subsystem 120 and processing 202 performed thereby, such processing is important when applying UWB processing to field data collected by separate wideband radars. Time delays and phase differences between the radars can make them mutually incoherent. To cohere the sub-bands, mutual coherence processing subsystem 120 fits an all-pole signal model from storage subsystem 130 to the spectral data samples in each sub-band and adjusts the models until they optimally match. Corresponding corrections are then applied to the underlying data samples. This approach assumes that the target can be accurately characterized by a superposition of discrete scattering elements. This is often a valid assumption for targets that are large with respect to a radar's wavelength. See J. B. Keller, "Geometrical theory of diffraction" Journal of Optical Society of America, pp 116–130, January 1962; W. M. Steedly and R. L. Moses, "High resolution modeling of fully polarized radar returns" IEEE Transactions on Aerospace and Electronic System, vol. AES-27, pp 459–469, May 1991; and E. F. Knott, J. F. Shaeffer and M. T. Tuley, Radar Cross Section, Artech House, Norwood, Mass., pp 178–179, 1985; the contents of which are incorporated herein by reference. Greater detail concerning mutual coherence processing is provided below in connection with FIG. 3.

Referring now to model fitting/parameter estimation subsystem 140 and the processing 203 it performs, subsystem 140 fits a global all-pole signal model to the mutually coherent sub-bands, allowing subsequent use of the model for interpolation and extrapolation. All-pole models are well-suited for UWB processing; they accurately characterize the target by a superposition of discrete scattering centers, each with it's own frequency dependent term. While all-pole models are best matched to signals that grow or decay exponentially fast with frequency, they can also be used to accurately characterize $f^{\alpha}$ scattering behavior over finite bandwidth intervals. Such modeling is further discussed below in connection with processing that uses sparse sub-band measurements to estimate the global all-pole model parameters.

To further illustrate the operation of radar system 100, consider a simulation of radar returns for a hypothetical target consisting of two discrete scattering centers. The scattering center closest to the radar has a scattering amplitude that decays with frequency, whereas the scattering center away from the radar has a scattering amplitude that grows with frequency. The simulated spectral signal samples are given by $$s_n = 4\left(\frac{f_n}{f_1}\right)^{-1} e^{i\frac{\pi}{4}n} + \left(\frac{f_n}{f_1}\right)^{+1} e^{i\frac{\pi}{3}n}. \quad \text{Eq. 1}$$

The frequency sampled phase terms correspond to a scattering center separation of 15 cm. Consider further the addition of white Gaussian noise to each signal sample, with a signal-to-noise ratio of 20 dB.

Assume for present purposes that only two sub-bands are available for coherent processing of the noisy $s_n$ signal, and that the $s_n$ signal samples in the lower sub-band have been modulated by the function $$e^{-i\frac{\pi}{9}n}$$

to simulate the effects of mutual incoherence, i.e. the signal poles for the lower sub-band have been rotated twenty degrees clockwise relative to the upper sub-band signal poles. The corresponding compressed-pulses do not line up because the sub-bands are not mutually coherent. In effect, mutual coherence is seen to be a consequence of uncertainty in position and time sequencing of the separate radars.

Figure 3:
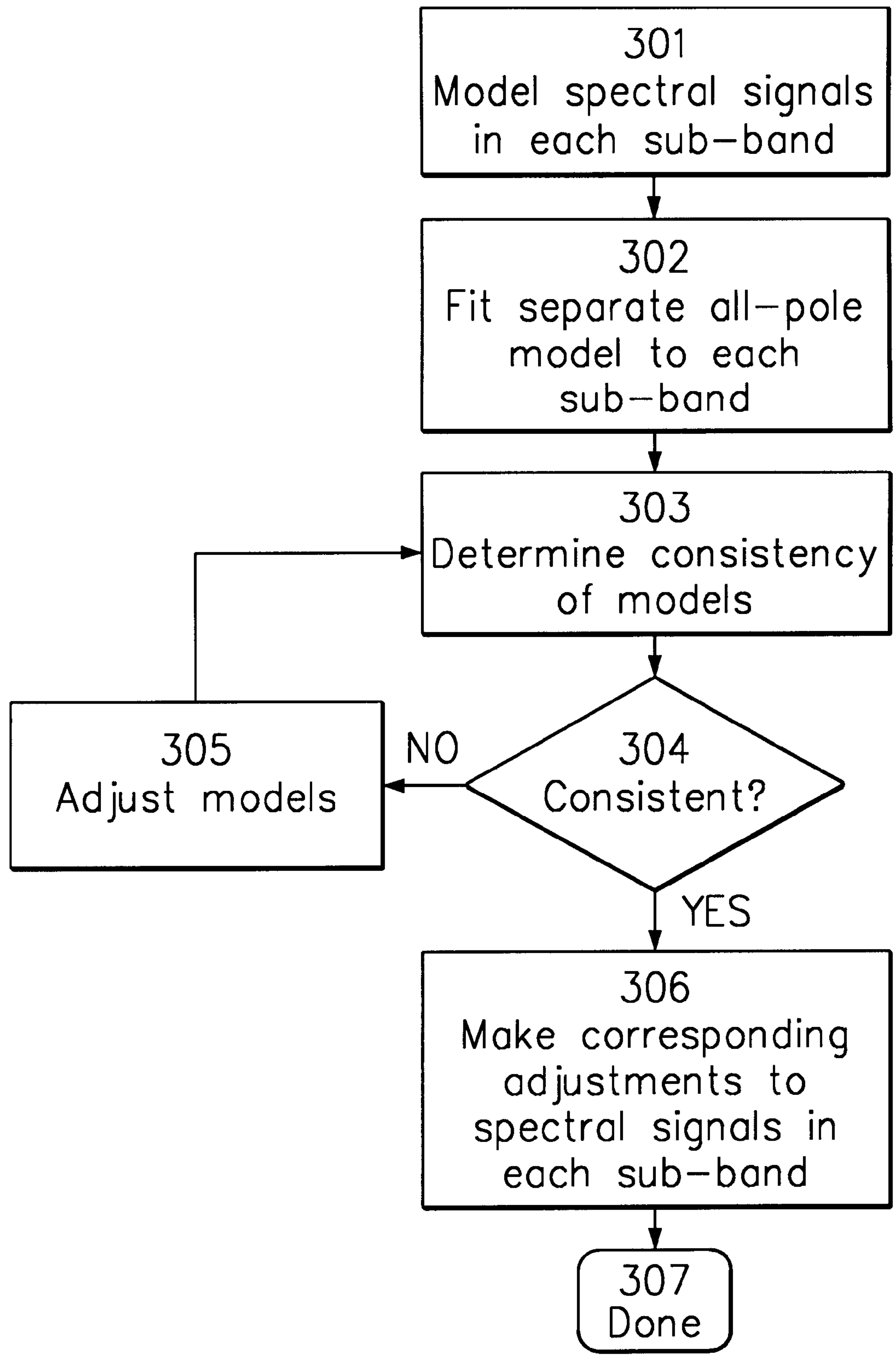
FIG. 3 is a flow diagram further detailing the mutual coherence processing of FIG. 2.

Referring now to FIG. 3, there is shown in greater detail the mutual coherence processing 202 of FIG. 2. Such processing begins by modeling 301 the spectral signals in each sub-band by a superposition of complex exponential functions. An all-pole signal model of the form $$M(f_n) = \sum_{k=1}^{P} a_k p_k^n \quad \text{Eq. 2}$$

is used for this purpose. The sample index n ranges from n=0, . . . , $N_1-1$ for the lower sub-band and from n=N−$N_2$, . . . , N−1 for the upper sub-band. The all-pole model parameters are physically meaningful. The number of scattering centers and their complex amplitudes are denoted by P and $a_k$, respectively. The poles $p_k$ characterize the relative ranges and frequency decay of the individual scattering centers, where the $f^{\alpha}$ frequency decay model indicated earlier is approximated by an exponential variation over the band of interest. The sub-bands are mutually cohered by fitting 302 a separate all-pole model to each sub-band and adjusting 305 the models until they are consistent 304. With the models consistent, corresponding corrections are then made 306 to the underlying spectral signals in each sub-band. Presented below are details of the sub-band modeling and mutual coherence process.

System 100 achieves all-pole modeling by using the singular-value-decomposition (SVD) of the forward prediction matrix. Specifically, the forward prediction matrix for the lower sub-band is given by $$H_1 = \begin{bmatrix} s_0 & s_1 & \cdots & s_{L-1} \\ s_1 & s_2 & \cdots & s_L \\ \cdots & \cdots & \cdots & \cdots \\ s_{N1-L} & s_{N1-L+1} & \cdots & s_{N1-1} \end{bmatrix}, \quad \text{Eq. 3}$$

where L denotes the correlation window length and the $s_n$ are the frequency domain radar measurements. The matrix $H_1$ has a special form; it is a Hankel matrix. Hankel matrices are associated with the transient response of linear-timeinvariant (LTI) systems. Subspace decomposition methods exploit the eigenstructure of Hankel matrices to estimate the parameters of LTI signal models in a conventional manner. See S. Y. Kung, K. S. Arun, and D. V. Bhaskar Rao "State-space and singular-value decomposition-based approximation methods for the harmonic retrieval problem," J. Opt. Soc. Am., Vol. 73, No. 12, December 1983, the contents of which are incorporated herein by reference and further describe the SVD used herein. Using a correlation window length $L=N_1/3$ generally provides for robust parameter estimates. Larger values of L can provide better resolution but the estimates may not be as robust to noise. The forward prediction matrix $H_2$ for the upper sub-band is constructed in a similar way; it is given by $$H_2 = \begin{bmatrix} s_{N-N2} & s_{N-N2+1} & \cdots & s_{N-N2+L-1} \\ s_{N-N2+1} & s_{N-N2+2} & \cdots & s_{N-N2+L} \\ \cdots & \cdots & \cdots & \cdots \\ s_{N-L} & s_{N-L+1} & \cdots & s_{N-1} \end{bmatrix}. \quad \text{Eq. 4}$$

Figure 4:
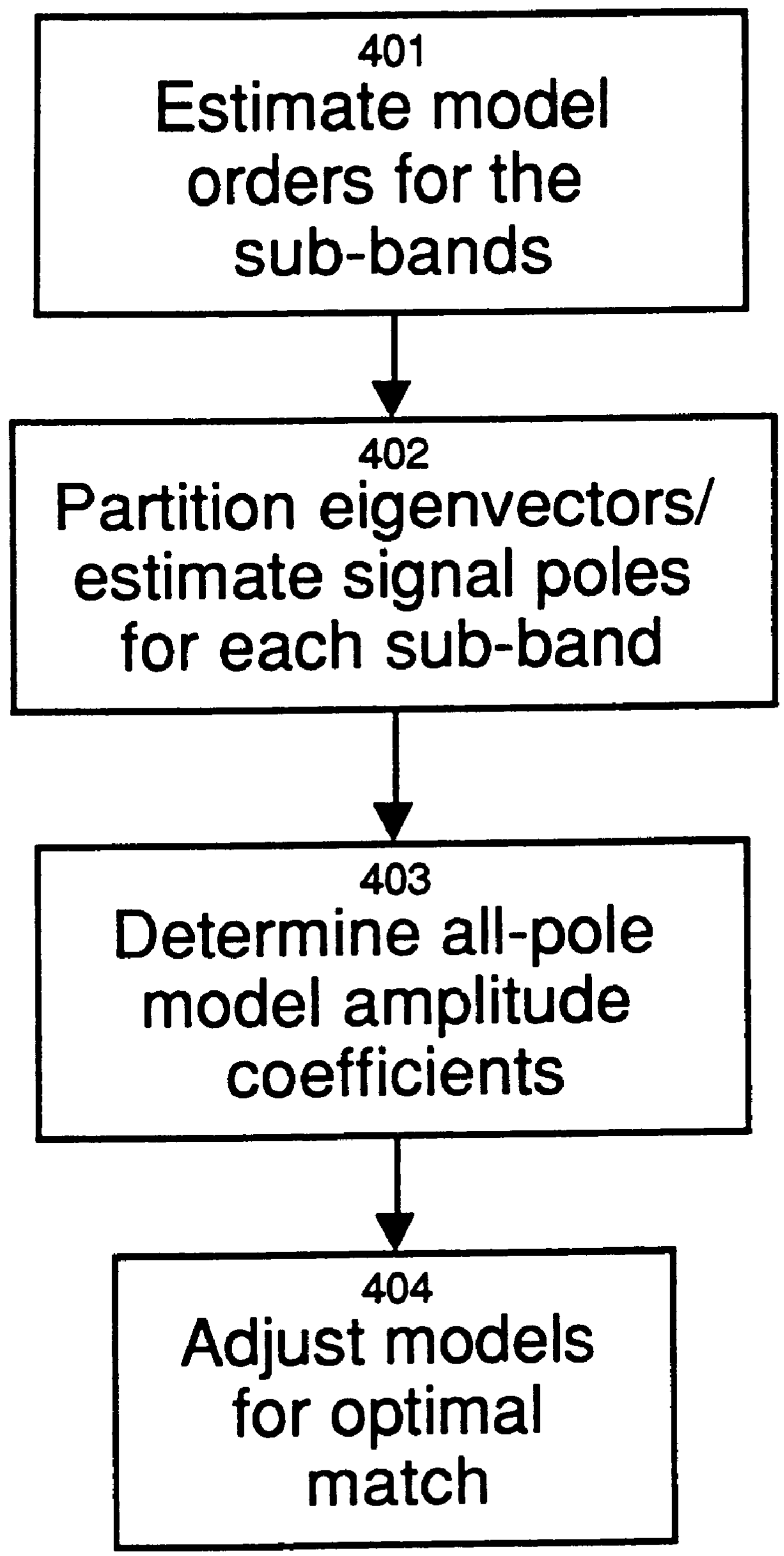
FIG. 4 is a flow diagram further detailing the all-pole model parameter estimation aspect of the mutual coherence processing of FIG. 2.

To estimate the all-pole model parameters for the lower and upper sub-bands, the SVD is applied to $H_1$ and $H_2$, respectively. The SVD decomposes $H_1$ and $H_2$ into the product of three matrices:

$$H_1=U_1S_1V_1', \quad \text{Eq. 5}$$

and $$H_2=U_2S_2V_2', \quad \text{Eq. 6}$$

where the symbol "'" denotes the Hermitian operator. The S matrices are diagonal and positive definite; they contain the "singular values" for the two sub-bands. The U and V matrices contain the corresponding eigenvectors. In particular, the columns of V correspond to the eigenvectors of the sub-band covariance matrices. By decomposing $H_1$ and $H_2$ in this way, it is straightforward to estimate the all-pole model parameters for each sub-band. Referring now also to FIG. 4, this is done in the four step process shown therein:

1. The singular value matrices $S_1$ and $S_2$ are used to estimate 401 the model orders $P_1$ and $P_2$ for the two sub-bands;
2. $P_1$ and $P_2$ are used to partition 402 $V_1$ and $V_2$ into orthogonal subspaces—a signal-plus-noise subspace and a noise subspace. A modified root-MUSIC algorithm, described below, is applied to estimate the signal poles for each sub-band;
3. The all-pole model amplitude coefficients, $\alpha_k$, are determined 403 using a linear least-squares fit to the measured data; and
4. The resulting sub-band signal models are adjusted 404 so that they optimally match.

In processing 401, the singular values in S are used to estimate appropriate model orders for the two sub-bands. The relatively large singular values in S correspond to strong signal components, while the small singular values generally correspond to noise. For low noise levels, there is a sharp transition between the large and small singular values. The transition point can be used as an estimate of the model order. At higher noise levels the transition from large to small singular values is smooth making accurate model order estimation more difficult. The Akaike Information Criterion (AIC) and Minimum Description Length (MDL) are two model order estimation methods that tend to work well in these cases. See H. Akaike, "A new look at the statistical model identification" IEEE Transactions on Automatic Control, vol. AC-19, pp 716–723, 1974; M. Wax and T. Kailath, "Detection of signals by information theoretic criteria" IEEE Transactions on Acoustics, Speech and Signal Processing, vol. ASSP-33, No. 2, pp 387–392, 1985; J. Rissanen, "Modeling by shortest data description" Automatica, vol. 14, pp 465–471, 1978; and M. Wax and I. Ziskind, "Detection of the number of coherent signals by the MDL principle" IEEE Transactions on Acoustics, Speech and Signal Processing, vol. ASSP-37, No. 8, pp 1190–1196, 1989; the contents of which are incorporated herein by reference.

Once the model orders $P_1$ and $P_2$ have been estimated, processing proceeds to 402 where the subspace decomposition properties of $V_1$ and $V_2$ are used to estimate the dominant signal poles for each sub-band. The matrices $V_1$ and $V_2$ are partitioned into orthogonal signal-plus-noise and noise subspaces, $$V_1=[V_1^{sn}V_1^{n}], \quad \text{Eq. 7}$$

and $$V_2=[V_2^{sn}V_2^{n}]. \quad \text{Eq. 8}$$

The partitioning is performed so that $V_1^{sn}$ and $V_2^{sn}$ have $P_1$ and $P_2$ columns, respectively. The noise subspace matrices $V_1^{n}$ and $V_2^{n}$ have L-$P_1$ and L-$P_2$ columns, respectively.

Pole estimates for each sub-band are obtained by employing a modified root-MUSIC algorithm as follows: Matrices $A_1$ and $A_2$ are defined from the noise subspace vectors for each sub-band as follows $$A_1=V_1^{n}V_1^{n'}, \quad \text{Eq. 9}$$

and $$A_2=V_2^{n}V_2^{n'}. \quad \text{Eq. 10}$$

Denote by $\alpha_{li}$ the elements of the first row of $A_1$ and by $b_{li}$ the elements of the first row of $A_2$. These elements are used to form polynomials $A_1(z)$ and $A_2(z)$ given by $$A_1(z) = \sum_{i=1}^{L} a_{1i} z^{(i-1)} \quad \text{Eq. 11}$$

$$A_2(z) = \sum_{i=1}^{L} b_{1i} z^{(i-1)} \quad \text{Eq. 12}$$

The roots of $A_1(z)$ and $A_2(z)$ correspond to pole estimates for bands 1 and 2, respectively.

This approach can be viewed as a variant of the traditional root-MUSIC algorithm described and referenced below. The modified approach described here has the advantage of providing high-resolution pole estimates while eliminating the symmetric pole ambiguities that result from the traditional root-MUSIC approach.

Pole estimates can also be obtained by applying one of the numerous conventional spectral estimation techniques known to those having skill in the art, e.g., S. W. Lang and J. H. McClellan, "Frequency estimation with maximum entropy spectral estimators" IEEE Transactions on Acoustics, Speech and Signal Processing, vol. ASSP-28, pp 716–724, 1980; R. O. Schmidt, A Signal Subspace Approach to Multiple Emitter Location and Spectral Estimation Ph.D. dissertation, Stanford University, Stanford, Calif., 1981; A. J. Barabell, J. Capon, D. F. Delong, J. R. Johnson and K. Senne, "Performance comparison of super-resolution array processing algorithms" Technical Report TST-72, Lincoln, Laboratory, MIT, 1984 (describing root-MUSIC algorithm); T. J. Shan, M. Wax and T. Kailath, "On spatial smoothing for direction of arrival estimation of coherent signals" IEEE Transactions on Acoustics, Speech and Signal Processing, vol. ASSP-33, pp 806–811, 1985; A. Paulraj, R. Roy and T. Kailath, "Estimation of signal parameters via rotational invariance techniques (ESPRIT)" Proceedings of the 19-th Asilomar Conference Circuits, Syst. Comput., Asilomar, Calif., pp 83–89, 1986; D. W. Tufts and C. D. Melissinos, "Simple, effective computation of principal eigenvectors and their eigenvalues and application to high-resolution estimation frequencies" IEEE Transactions on Acoustics, Speech and Signal Processing, vol. ASSP-34, No. 5, pp 1046–1053, 1986; A. Moghaddar, Y. Ogawa and E. K. Walton "Estimating the time-delay and frequency decay parameter of scattering components using a modified MUSIC algorithm" IEEE Transactions on Antennas and Propagation, vol. 42, No. 10, pp 1412–1418, 1994; C. W. Ma and C. C. Teng, "Detection of coherent signals using weighted subspace smoothing" IEEE Transactions on Antennas and Propagation, vol. 44, pp 179–187, 1996; the contents of all of which are incorporated herein by reference.

In a preferred embodiment, the poles estimates are obtained for each sub-band by applying the modified root-MUSIC algorithm to $V_1^n$ and $V_2^n$. The root-MUSIC algorithm finds poles corresponding to the signal vectors that are most orthogonal to the noise subspace vectors. In general, the $f^{60}$ avariation of the signal model leads to poles displaced off the unit circle in the complex z-plane. However, over each sub-band, the variation of $f^{\alpha}$ is small, so that the dominant signals correspond to poles that lie close to the unit circle. Following the model order estimates from 401, system 100 uses the $P_1$ poles closest to the unit circle to characterize the dominant lower sub-band signals and the $P_2$ poles closest to the unit circle to characterize the dominant upper sub-band signals.

At this point, an estimate is determined 403 for the all-pole amplitude coefficients, $\alpha_k$, for the lower and upper sub-bands. Specifically, an optimal set of amplitude coefficients is found by solving a standard linear least-squares problem. This processing completes the all-pole modeling process for each sub-band. The lower and upper sub-band signal models will be denoted by $M_1(f_n)$ and $M_2(f_n)$, respectively.

Next the sub-band signal models $M_1(f_n)$ and $M_2(f_n)$, are adjusted 404 until they optimally match. There are many possible ways to do this. In a preferred embodiment, the lower sub-band signal is modulated and phase aligned until it closely matches the upper sub-band signal model. Symbolically, the cost function C, $$C=\sum_{n=0}^{N-1}|AM_1(f_n)e^{i\Delta\theta n}-M_2(f_n)|^2, \quad \text{Eq. 13}$$

is minimized with respect to the pole rotation angle $\Delta\theta$ and complex amplitude coefficient A. Another approach for matching the sub-band signal models is to find an appropriate rotation matrix that best aligns the signal subspace vectors contained in $V_1$ and $V_2$. Whichever method is employed, the sub-band model alignment process will tend to promote a strong sense of mutual coherence between the two sub-bands.

Although the two signal models thus obtained may not entirely agree, they will have approximately the same signal poles. The corresponding all-pole model coefficients $\alpha_k$, however, are significantly different. The lower sub-band favors the decaying signal component whereas the upper sub-band favors the growing signal component. As described below, model fitting/parameter estimation subsystem 140 and the associated processing illustrated in FIG. 5 coherently combines the two sub-bands using a single all-pole signal model.

Figure 5:
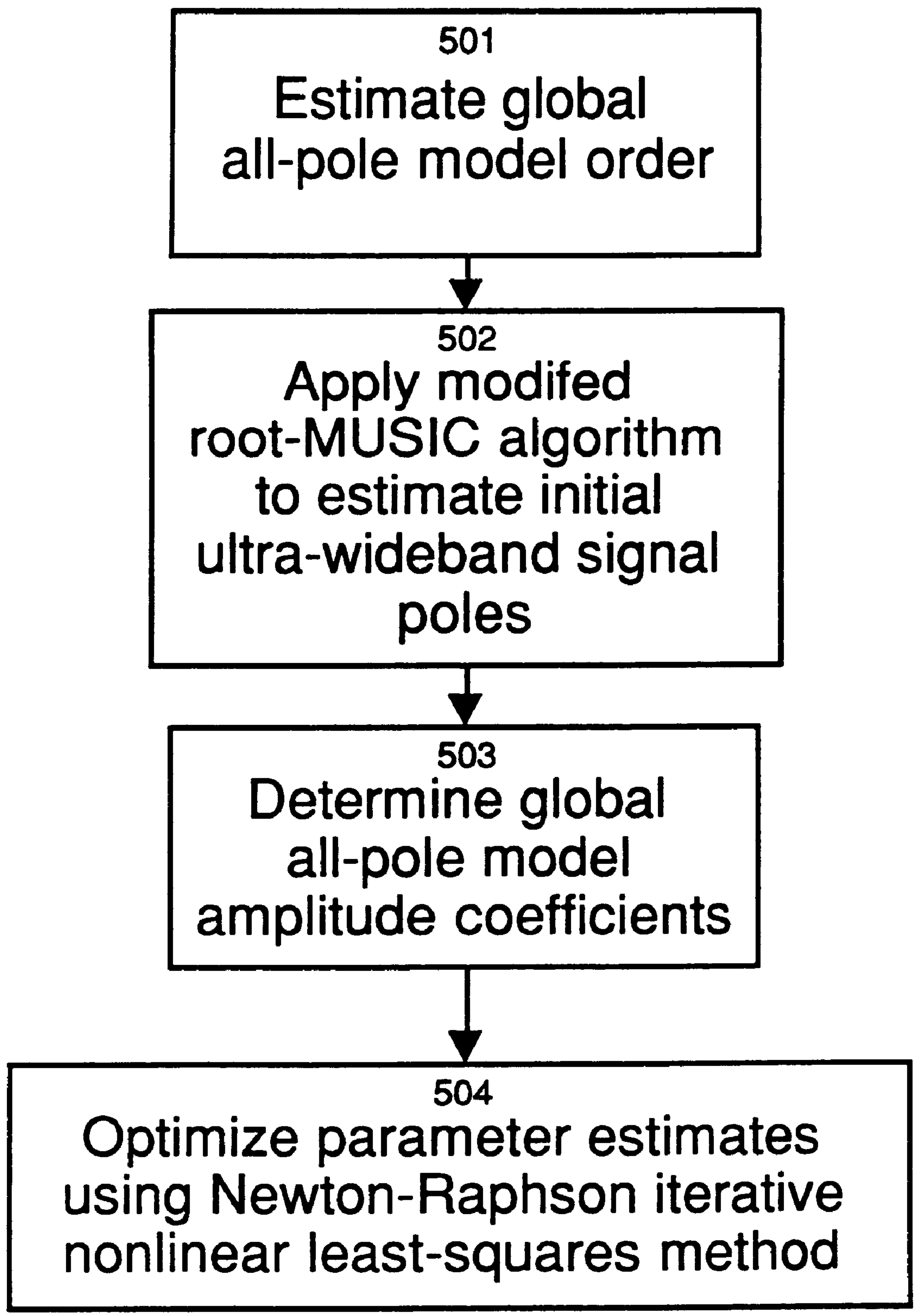
FIG. 5 is a flow diagram further detailing the model fitting and parameter estimation of FIG. 2.

Referring now to FIGS. 2 and 5, once the radar sub-bands have been mutually cohered, a global all-pole signal model is optimally fit 203 to the measured data. In a preferred embodiment, all-pole model parameters are determined that minimize the function J given by $$J=\sum_{\langle n\rangle}q_n|s_n-M(f_n)|^2. \quad \text{Eq. 14}$$

The index n ranges over all of the available data samples. The function J measures the total weighted error between the model $$M(f_n)=\sum_{k=1}^{P}a_kp_k^n \quad \text{Eq. 15}$$

and the mutually coherent data samples in each sub-band. The coefficients $q_n$ are used to weight the measurements appropriately.

Minimizing J with respect to the all-pole model parameters is a difficult nonlinear problem with no closed-form solution. Brute force numerical solutions are also infeasible due to the potentially large number of signal parameters that need to be estimated. In a preferred embodiment, this problem is solved as illustrated-in FIG. 5. An estimate of the global all-pole model order is obtained 501 by singular value decomposition (SVD) as referenced above. After estimating model order, the modified root-MUSIC algorithm 502 described above is applied to provide an initial estimate of the global all-pole model signal poles. The global all-pole model amplitude coefficients, $\alpha_k$, are found 503 by solving a standard least-squares problem. The initial pole and amplitude estimates are iteratively optimized 504 using a Newton-Raphson (NR) nonlinear least-squares method. If the initial parameter estimates are close to optimal, the NR-method will rapidly converge to the all-pole model parameters that minimize J. More specifics on the initial parameter estimation step are provided below.

There are many ways to obtain an initial estimate of the global all-pole model parameters. One approach is to construct the multi-band prediction matrix H given by $$H=\begin{bmatrix}H_1\\H_2\end{bmatrix}. \quad \text{Eq. 16}$$

The sub-matrices $H_1$ and $H_2$ correspond to the forward prediction matrices for the lower and upper sub-bands, respectively. This approach is referred to herein as sub-aperture processing, and combines the data samples from both sub-bands, providing the potential for robust parameter estimates from noisy data. It is also possible to obtain multi-band parameter estimates by allowing for cross-correlation between the sub-bands, i.e. by defining H as $$H=[H_1H_2] \quad \text{Eq. 17}$$

This method is referred to herein as extended aperture processing. Extended aperture processing provides the potential for true ultra-wideband resolution, although the resulting pole estimates are typical more sensitive to noise.The two methods, sub-aperture processing and extended aperture processing, can be combined to provide robust high-resolution estimates of the dominant signal poles. In a preferred embodiment, the combined approach is used to realize the benefits of both sub-aperture and extended aperture processing. Specifically, sub-aperture processing is applied first to obtain a coarse but highly robust estimate of the signal poles. Extended aperture processing is then used to fine-tune these estimates. In any event, multi-band parameter estimates are obtained by decomposing H into the product of three matrices $$H=USV'. \quad \text{Eq. 18}$$

An estimate of the model order P is obtained 501 by applying the AIC or MDL techniques, referenced above, to the spectrum of singular values contained in S. The model order estimate is used to partition V into orthogonal signal-plus-noise and noise subspaces. Initial pole estimates are obtained as described above in connection with FIGS. 2 and 3, or alternatively using any other super-resolution spectral estimation technique.

Processing 504 using the NR-algorithm uses the initial parameter estimates to find the global all-pole model parameters, $\alpha_k$ and $p_k$, that locally minimize the cost function J. The model order P remains fixed during this iterative process. The algorithm typically converges to a local minimum of J in only a few iterations. Details of the NR-algorithm are found in many standard texts on numerical analysis, see, e.g., W. H. Press, S. A. Teukolsky, W. T. Vetterling, and B. P. Flannery "Numerical recipes in C: The art of scientific computing (second edition)," Cambridge University Press, 1992, the contents of which are incorporated herein by reference.

In practice, it is found that the all-pole model obtained as described herein is in excellent agreement with truth over the entire ultra-wideband frequency range. The ultra-wideband compressed pulse uses the mutually coherent radar measurements within the two sub-bands and the global all-pole model in the vacant band 204. One of the strengths of this approach is that nearly perfect phase coherence is maintained throughout the entire ultra-wideband processing interval, allowing coherent output processing 205 to be applied to the resulting ultra-wideband compressed pulses. Ultra-wideband radar imaging and Doppler-Time-Intensity analysis are examples of typical coherent output processes. It should also be noted that the pulse compression process described above provides for calibrated amplitude estimates for the various target scattering centers.

All-pole signal models are usable to accurately characterize $f^{\alpha}$-type scattering behavior over ultra-wide bandwidths. The ultra-wideband pole estimates can be transformed into equivalent estimates of the $\alpha$ coefficients for $f^{\alpha}$-type signal models. It is always possible to find an $f^{\alpha}$ function that best matches the exponential behavior of an ultra-wideband signal pole over a given frequency range. One may also derive an approximate analytical relationship between the pole magnitudes and the corresponding $\alpha$ coefficients by matching the functions $f^{\alpha_k}$ and $|p_k|^n$ at the lowest and highest ultra-wideband frequencies. This relationship is given by $$\alpha_k = \frac{(N-1)\log(|p_k|)}{\log\left(1+(N-1)\frac{df}{f_1}\right)}, \quad \text{Eq. 19}$$

where $df$ and $f_1$ denote the spectral sample spacing and lowest ultra-wideband frequency, respectively. The constant N denotes the total number of ultra-wideband frequency samples. In the two scattering center example discussed above, the two dominant signal poles $p_1$ and $p_2$ are given by $$p_1=0.992e^{i\pi/4}$$

$$p_2=1.005e^{1\pi/3} \quad \text{Eqs. 20,21}$$

By substituting these poles into equation 19, one obtains an accurate estimate of the true $\alpha$ coefficients used in the simulation. Thus, the ultra-wideband pole locations provide scatterer typing information. This information is useful for analyzing the details of targets with the viewpoint of constructing an accurate measurement-based model.

Thus, a system using ultra-wideband processing of sparse sub-band measurements significantly improves range resolution and provides accurate characterizations of realistic targets over ultra-wide bandwidths. The practical benefit of this technology is that radar measurements need not be taken over the full ultra-wideband processing interval; signal processing can be used to a certain extent to compensate for any missing data. Another important benefit of ultra-wideband processing is that the $\alpha$ coefficients of individual scattering centers can be more accurately estimated. This facilitates identification of the scattering centers that make up a target, which significantly benefits analysis and understanding of the target.

What is claimed is:

1. A system for obtaining an ultra-wideband (UWB) radar signature of a target, comprising:

a first sub-band radar transceiver operating on a first sub-band and producing a first sub-band radar signal;

a second sub-band radar transceiver operating on a second sub-band and producing a second sub-band radar signal;

a mutual coherence processing subsystem, operatively coupled to the first sub-band radar transceiver and the second sub-band radar transceiver, adapted to receive as input the first sub-band radar signal and the second sub-band radar signal and to produce a mutually cohered signal in response thereto; and an estimation subsystem, operatively coupled to the mutual coherence processing subsystem, adapted to receive as input the mutually cohered signal and to produce as output a UWB estimate signal corresponding to the UWB radar signature of the target.

2. A system as in claim 1, wherein the estimation subsystem includes a subsystem adapted to apply a UWB all-pole signal model for producing the UWB estimate signal.

3. A system as in claim 1, wherein the estimation subsystem includes a subsystem adapted to apply signal processing for optimal estimation of parameters of an UWB signal model for producing the UWB estimate signal.

4. A system as in claim 1, wherein the estimation subsystem interpolates UWB signature information corresponding to frequencies between the first sub-band and the second sub-band.

5. A system as in claim 1, wherein the estimation subsystem extrapolates UWB signature information corresponding to frequencies outside a range defined by the first sub-band and the second sub-band.

6. A system as in claim 1, wherein the estimation subsystem coherently combines measured and estimated signals in producing the UWB estimate signal.

7. A system as in claim 1, further comprising an output processing subsystem operatively coupled to the estimation subsystem, receiving as input therefrom the UWB estimate signal, processing the UWB estimate signal, and producing as output a display signal corresponding to the UWB radar signature of the target.

8. A method of obtaining an ultra-wideband (UWB) radar signature of a target, comprising:

obtaining a first sub-band radar signal from a first sub-band radar transceiver operating on a first sub-band;

obtaining a second sub-band radar signal from a second sub-band radar transceiver operating on a second sub-band;

mutually cohering the first sub-band radar signal and the second sub-band radar signal; and producing a UWB estimate signal corresponding to the UWB radar signature of the target.

9. A method as in claim 8, further including applying a UWB all-pole signal model for producing the UWB estimate signal.

10. A method as in claim 8, further including applying signal processing for optimal estimation of parameters of an UWB signal model for producing the UWB estimate signal.

11. A method as in claim 8, further including interpolating UWB signature information corresponding to frequencies between the first sub-band and the second sub-band.

12. A method as in claim 8, further including extrapolating UWB signature information corresponding to frequencies outside a range defined by the first sub-band and the second sub-band.

13. A method as in claim 8, further including coherently combining measured and estimated signals in producing the UWB estimate signal.

14. A method as in claim 8, further including processing the UWB estimate signal and producing therefrom a display signal corresponding to the UWB radar signature of the target.

* * * * *